US009934542B2

(12) United States Patent
Chauhan et al.

(10) Patent No.: US 9,934,542 B2
(45) Date of Patent: Apr. 3, 2018

(54) SYSTEM AND METHOD TO DETECT ONLINE PRIVACY VIOLATION

(71) Applicant: Infosys Limited, Bangalore (IN)

(72) Inventors: Nitin Singh Chauhan, Hyderabad (IN); Ashutosh Saxena, Hyderabad (IN); Krishna Chaitanya Telikicherla, Hyderbad (IN)

(73) Assignee: Infosys Limited, Bangalore (IN)

( * ) Notice: Subject to any disclaimer, the term of this patent is extended or adjusted under 35 U.S.C. 154(b) by 820 days.

(21) Appl. No.: 14/493,316

(22) Filed: Sep. 22, 2014

(65) Prior Publication Data

US 2015/0088777 A1 Mar. 26, 2015

(30) Foreign Application Priority Data

Sep. 23, 2013 (IN) .......................... 4300/CHE/2013

(51) Int. Cl.
*G06Q 50/26* (2012.01)
*G06Q 30/00* (2012.01)

(52) U.S. Cl.
CPC .......... *G06Q 50/265* (2013.01); *G06Q 30/01* (2013.01)

(58) Field of Classification Search
None
See application file for complete search history.

(56) References Cited

U.S. PATENT DOCUMENTS

| | | | | |
|---|---|---|---|---|
| 8,261,362 | B2 | 9/2012 | Goodwin et al. | |
| 9,495,714 | B2 * | 11/2016 | Bush | G06Q 50/01 |
| 9,703,988 | B1 * | 7/2017 | Sudbury | G06F 21/64 |
| 9,720,555 | B2 * | 8/2017 | Sorden | G06F 3/048 |
| 2009/0018850 | A1 * | 1/2009 | Abhyanker | G06Q 50/265 705/325 |

(Continued)

FOREIGN PATENT DOCUMENTS

| | | | |
|---|---|---|---|
| WO | 2010011449 | A1 | 1/2010 |
| WO | 2011112492 | A2 | 9/2011 |
| WO | 2013055564 | A1 | 4/2013 |

OTHER PUBLICATIONS

Wills et al, "Understanding What They Do with What They Know (Short Paper)", Oct. 15, 2012, WPES'12, AMC, p. 13-18.*

(Continued)

*Primary Examiner* — Christopher Revak
(74) *Attorney, Agent, or Firm* — Klarquist Sparkman, LLP

(57) ABSTRACT

The present invention relates to a method to detect online privacy violation. The method comprising steps of embedding a tracker into a web browser to open at least one data consumer website or at least one third party website wherein a user submits at least one data value into their corresponding data field in a data consumer website; generating one or more privacy profile using the tracker wherein the profile assists the user to select one or more data fields as per the user preferences; capturing the user selected one or more data fields and their corresponding plurality of browsing history using the tracker; storing the profile and the plurality of browsing history into at least one database; triggering of the tracker for detecting online privacy violation in a third party website and submitting at least one data field into at least one input field to detect online privacy violation for the submitted data field.

17 Claims, 8 Drawing Sheets

(56) References Cited

U.S. PATENT DOCUMENTS

| | | | | |
|---|---|---|---|---|
| 2009/0287706 | A1* | 11/2009 | Bourges-Waldegg | G06F 21/6209 |
| 2011/0087753 | A1* | 4/2011 | Yu | G06Q 30/02 709/217 |
| 2011/0276396 | A1* | 11/2011 | Rathod | G06F 17/30867 705/14.49 |
| 2012/0291144 | A1 | 11/2012 | Chen et al. | |
| 2012/0323794 | A1 | 12/2012 | Livshits | |
| 2013/0091452 | A1* | 4/2013 | Sorden | G06F 3/048 715/771 |
| 2013/0297346 | A1* | 11/2013 | Kulkarni | G06F 21/6245 705/3 |
| 2014/0129779 | A1* | 5/2014 | Frachtenberg | G06F 12/122 711/136 |
| 2015/0127628 | A1* | 5/2015 | Rathod | H04W 4/206 707/710 |
| 2017/0207969 | A1* | 7/2017 | Lehtovirta | H04L 41/0846 |

OTHER PUBLICATIONS

Jang et al, "An Empirical Study of Privacy-Violating Information Flows in JavaScript Web Applications", Oct. 2010, CCS'10, ACM, p. 270-283.*

Bapat et al, "Restraining Add-On's Behavior in Private Browsing", Apr. 2012, SecurIT'12, ACM, p. 194-199.*

Hofinger et al, "When Browsing Leaves Footprints", Apr. 10, 2012, MPM'12, ACM, p. 1-6.*

Sanket Baviskar et al, "Protection of Web User's Privacy by Securing Browser from Web Privacy Attacks" , Department of Computer Science and Engineering, National Institute of Technology, IJCTA, Jul.-Aug. 2011.

Miguel A. Monjas et al."Privacy Delegate: a browser-based tool for privacy self-management in social network", CDTI, Ministry of Science and Innovation of Spain.

* cited by examiner

SYSTEM AND METHOD TO DETECT ONLINE PRIVACY VIOLATION

RELATED APPLICATION DATA

This application claims priority to India Patent Application No. 4300/CHE/2013, filed Sep. 23, 2013, the disclosure of which is hereby incorporated by reference in its entirety.

FIELD OF THE INVENTION

The present invention relates to detection of online privacy violation. More particularly, the present invention relates to a system and a method to detect online privacy violation in third party websites.

BACKGROUND

Privacy problem has escalated in new challenging environment of cloud and big data. Widespread use of social networking sites has increased the opportunity of privacy exposure. In the online world, data has become equivalent to currency of the real world. Search engines, e-commerce sites, online social networks, advertisers, fraudsters, spammers etc. are in thirst of data of users, more specifically Personally Identifiable Information (PII), which can be used for genuine as well as malicious purposes. With the outburst of social apps, mobile apps and cloud based frameworks, assuring privacy on the modern web is a challenging task.

In most cases, sharing of user's data by a website to its partners is subjected to legal terms and conditions of the site. Once data moves from a user's browser to the internet, there is no mechanism to track the data or detect possible privacy violation. To an extent, some applications contribute towards protection of privacy by preventing third party cookies from following users on the web or by providing means to clean public databases via their API's (Application programing interface). However, these techniques do not assist in detecting how user's data has been leaked to the public or which site violated their privacy agreement.

In today's digital era, online presence has become a commonplace. Almost all activities of the real world such as collaboration, shopping, discussions, banking etc., have moved online and many of them require personal information of end users. With privacy being a clear threat, it is only recently that companies started focusing on privacy preserving applications. Since online privacy failures can occur at several places right from visible IP address, unencrypted traffic, insecure applications, online social networks etc., there are technologies which attempt to protect privacy in each of these specific areas, which are different from the present disclosure.

A service called BurnNote™ allows users to send self-destructing data to other users online, so that sensitive information is not stored in emails or leaked to the web. Tor browser bundle allows users to browse the web anonymously by encrypting network traffic and routing through complex network nodes. There are (virtual private network) VPN clients which provide anonymous browsing capabilities, suitable for connecting to unsecured Wi-Fi hotspots.

There are several applications for mobile devices which analyze the permissions required by each of the installed applications and report if there is any escalation of permissions in each case.

There are certain browser extensions which route information through proxy servers so that third party cookies (which track users) can be blocked. There are browser extensions designed to help users in understanding and taking control of the data they share on specific sites such as Facebook™, Twitter™, and Gmail™ etc. Also, there are tools which help users in understanding who can see their profiles on social networks like Facebook™ and what data will be visible to the public. Though not a privacy protection feature, web browsers store a history of sites visited by users, sometimes along with form data, and this may be used for manual inspection of visited sites.

The drawbacks of the above mentioned prior art is that there are no systems or methods to track information submitted on webpages and check against it later to detect privacy violations. Existing technologies may have feature to store submitted pages but data field's storage cannot be selective or personalized. Existing methods of page information storing even retains the submitted data. Storage of this information or sharing it to third party could lead to privacy violations.

In the present era of web based services, users provide personal information to many websites. It's practically challenging to keep track of these sites and data fields submitted to them manually.

The browser's native history maintenance technique resembles the functionality of privacy tracker database of the present disclosure to some extent. However, it is designed only to assist users in navigation and not as a privacy tracking or privacy violation detecting mechanism. Even otherwise, it has shortcomings such as: The "Clear History" option in browsers completely erases all browsing history of users. Reinstalling browsers will erase browsing history information. Since history data is stored locally in the machine, it is not available when users change their machines or it cannot be segregated when multiple users use the same machine.

Some existing applications contribute towards privacy protection by preventing third party cookies from following users on the web or by providing means to clean public databases via their APIs. Techniques such as self-destructing emails, anonymous browsing, data encryption, analysis of privileges in mobile devices etc. contribute towards privacy preservation. However, these techniques neither assist in detecting how user's data leaked to the public nor inform which site violated their privacy agreement.

The existing methods or products are designed to work specific to each context. Some products target removal of third party cookies which keep tracking users on the web. Some products track privacy breaches specific to Facebook™ while some other products target data queried only by search engines. Most of these solutions are tightly coupled with the configurations specific only to a certain set of popular websites or channels. They do not answer important questions such as how the data got leaked to the public or which party has violated user's privacy by sharing data with third parties.

The present disclosure addresses the problem of detection of privacy violation on the internet. It alerts the user when such a violation takes place so that the user can take suitable actions.

The present system does not have any tightly coupled configuration with any websites.

Also restriction to specific sites with respect to detecting privacy violations is not provided in the present system. Since the privacy information database is based on cloud, it is highly scalable and does not have any limit on the amount of data that can be processed. With respect to all these factors, the present system improves on existing techniques.

Thus there is a need to provide a system and a method that tracks privacy related information and browsing history of the user, while assisting the user in detecting possible privacy violation. The method of creating user privacy profile, collecting information for submitting data to website and storing in specific format on the cloud and feature of checking the possible privacy violation by submitting data field and matching it with browsing history is found in the present disclosure. Privacy profile update, privacy violations detection and browsing history update is hosted as cloud service in the present system and the user can access this service without dependency on specific browser or machine or location. Thus the present system benefits the user in legal process wherever privacy laws are applicable. User can technically establish who could be the potential privacy law violators.

Therefore the present system helps in creating privacy fingerprint for user by collecting details of web based activity where personal information is shared with third parties. There are possibilities that data collecting agencies or enterprise may share user data to third party for their business benefit, without taking users consensus. If user notice, such information is used by third party and represented on its website, user can identify data collector who might have involved in privacy violation.

Thus it will increase user confidence in services offered over web and help in businesses which collect information as part of their business process to offer more user friendly and trustworthy services.

The present disclosure provides flexible implementation of the system. Privacy tracking can be provided as a service on Cloud, where user can access the service from any browser, machine, location. All details related to browsing history, privacy profile are stored in cloud environment.

In present disclosure, actual data values are not stored or shared with cloud service provider. Only the data field name along with some other browsing details is stored in browsing history database.

SUMMARY

According to one of the aspect of the present invention there is provided a method to detect online privacy violation. The method comprising steps of embedding a tracker into a web browser to open at least one data consumer website or at least one third party website wherein a user submits at least one data value into their corresponding data field in a data consumer website.

Generating one or more profile using the tracker, wherein the profile assists the user to select one or more data fields as per the user preferences; capturing the user selected one or more data fields and their corresponding plurality of browsing history using the tracker; storing the profile and the plurality of browsing history into at least one database through the tracker; triggering of the tracker for detecting online privacy violation in a third party website; and submitting at least one data field by the user into at least one input field as provided through the tracker to detect online privacy violation for the submitted data field.

The triggering of at least one processor using the tracker to compare the submitted data field with the data field as stored in the database and matching of the stored data field with its corresponding browsing history to indicate one or more websites with their related timestamps that have assisted in violating privacy of the user by leaking the submitted data field to the third party website.

According to another aspect of the present invention there is provided a system to detect online privacy violation. The system comprising a browser to open at least one data consumer website or at least one third party website; wherein in the consumer data website the user submits at least one data value into their corresponding data field; a tracker embedded into a browser, the tracker assists to generate one or more profiles for the user, the profile enables user to select one or more data fields as established on user preferences; wherein the tracker captures the user selected data field and their corresponding plurality of browsing history; and a privacy system operatively connected with the tracker, the privacy system comprises at least one processor and at least one database.

The database stores the profile and the plurality of browsing history; wherein the tracker is triggered through the user for detecting online privacy violation in a third party website, wherein the tracker enables the user to submit at least one data field into at least one input field as provided through the tracker to detect online privacy violation for the submitted data field; wherein the processor being triggered by the tracker to compare the submitted data field with the stored data field in the database and matching of the stored data field with its corresponding browsing history to indicate one or more websites with their related timestamps that have assisted in violating privacy of the user by leaking the submitted data field to the third party.

DETAILED DESCRIPTION

The present disclosure proposes to track and detect privacy violation on the web. An advisory system is developed which assists users of the web to maintain their own record of data they share with each website. The architecture of the present system is explained in the adjoined FIG. 1.

Figure 1:
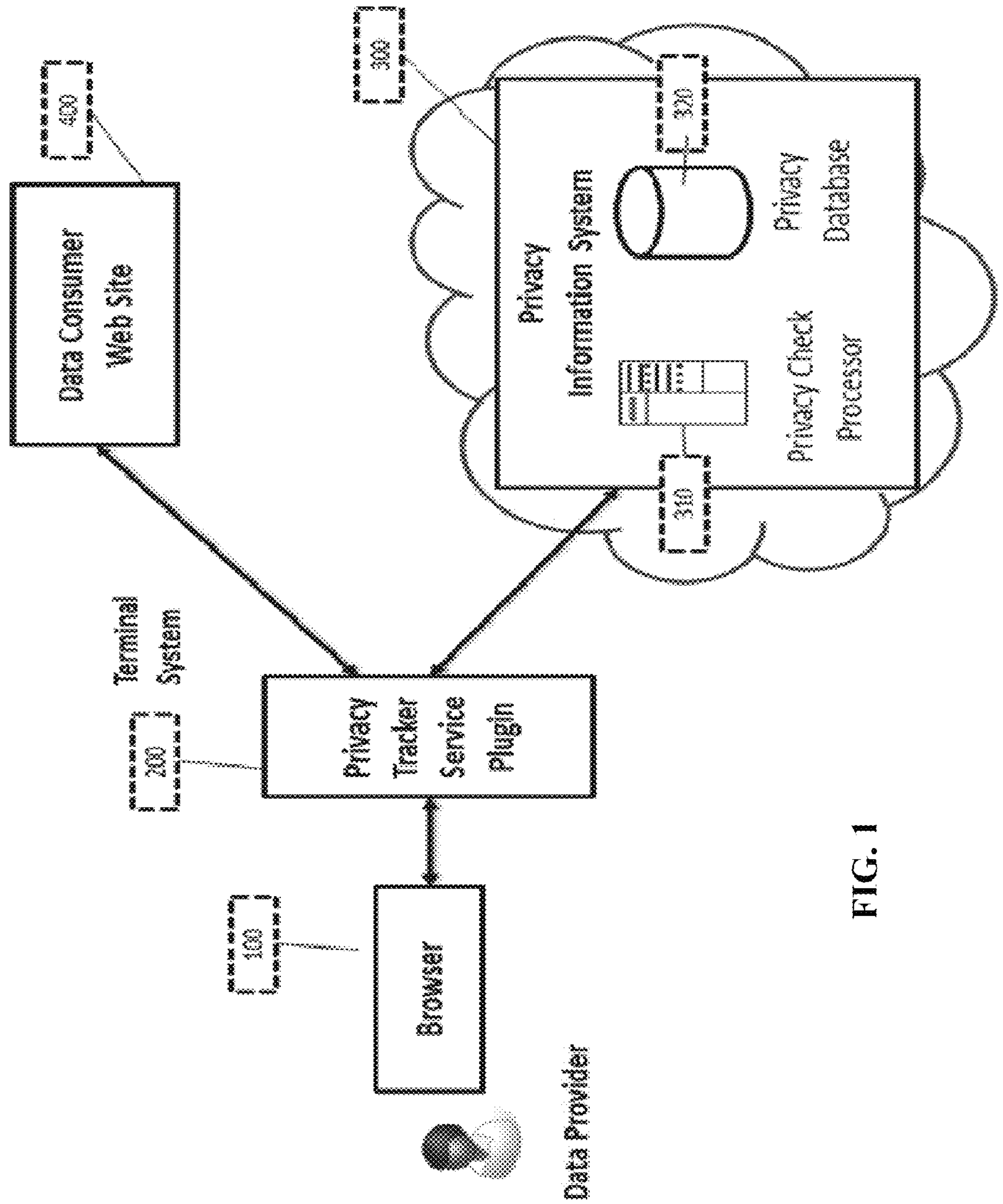
FIG. 1 illustrates the architecture the present system to detect online privacy violation.

FIG. 1 shows the system to detect online privacy violation. The system includes two main components, one of which is a browser plugin called privacy tracker service plugin (PTSP) 200 or also known as the tracker 200, while the other is a cloud based system called privacy information system 300 or also known as the privacy system 300, which has a privacy tracker database 320 also known as the database 320 and a privacy check processor 310 also known as the processor 310. Browser 100 which is a browser that is a software application for retrieving, presenting and traversing information resources on the web.

The browser 100 receives URL as input and access the information resource available on web. The end users access certain webpage through browser and submit their data or perform various activities, which could lead to generation of user related private data. This data is submitted to web sites of information collecting entity to meet users or business interest. Privacy tracker service plugin 200 is one of the components which is embedded as browser component/plugin and gets activated when user opens any webpage to submit data to data consumer website (DCWeb), 400 or perform some activity on the website. Privacy tracker service plugin 200 provides option to user to create his personalized privacy profile.

Data consumer web site 400 is owned by business or enterprise or organization or individuals who provide the option for user to submit their details. These details are submitted as forms and used by enterprise to process this information for business or user interest.

User is able to define personal data fields which are sensitive and private. User is also able to define type of data and activity on website that should be logged in proposed system when users submit the data or perform activity. This customized information is captured by PTSP 200 and stored in privacy tracker database (PTD, 320). Whenever user submits any form on website, PTSP 200 retrieves the personalized profile and it identifies user defined personal data fields for which details are being submitted. PTSP 200 stores this information along with website details, time stamp in PTD 320 as privacy data history.

Further the PTSP 200 has another role when users access some website and identifies or suspects some sensitive personal data pertaining to him. The user then submits the identified data field to PTSP 200, which checks user's privacy profile history stored in PTD 320. It alerts for privacy violation if website reflecting the data value is never been provided with specific information. During a browsing session, if the system encounters user's data which is not in its database, the privacy tracker service plugin 200 alerts the user about the possible sites which have violated user's privacy and suggests suitable actions.

Privacy tracker database 320 stores user privacy profile and privacy data history in is database 320.

In privacy check processor, 310 whenever user queries about some suspected data field, PCP 310 retrieves the user profile and also checks websites where sensitive data was submitted. Based on search result, PCP 310 provides result to user through PTSP 200.

Figure 2:
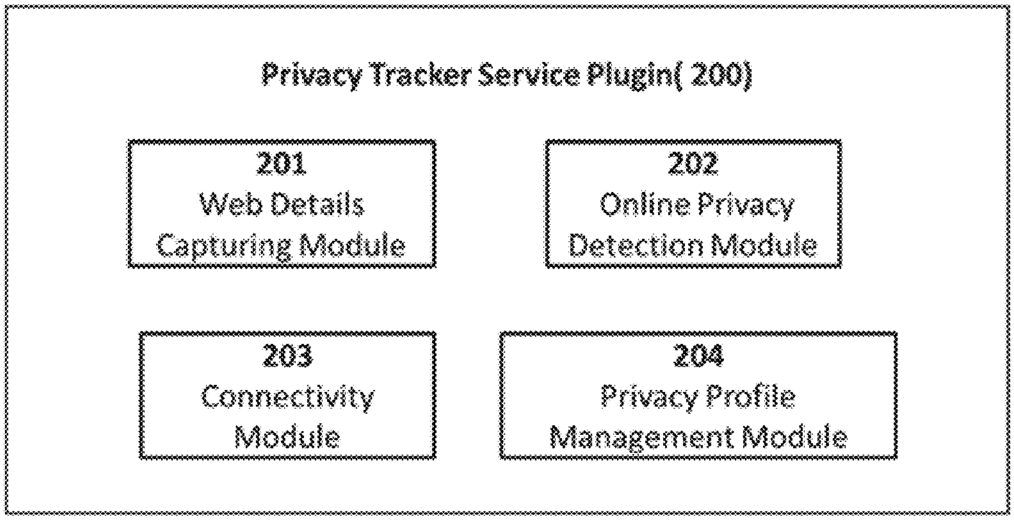
FIG. 2 illustrates the subcomponents of privacy tracker service plugin.

FIG. 2 shows the subcomponents of the privacy tracker service plugin 200. Web details capturing module 201 captures the information about data field and user activities from web page as per user's privacy profile.

Online privacy detection module 202 enables user to verify any potential privacy violation, while accessing third party website. In case user related personal information is displayed on third party webpage, user can probe the privacy information system to check from users browsing history stored in privacy tracker database 320. This module also raises alert after checking and display information about potential website that might have compromised user's privacy details. This module can be manual or automated based on implementation.

Connectivity module 203 enables connectivity to various other components to send and retrieve the information.

The privacy profile management module 204 enables user to create his/her personal profile/preference/actions related to privacy. Users can add, modify, and delete the profile as per their requirement. Users can define data fields which are sensitive and contain private data.

Figure 3:
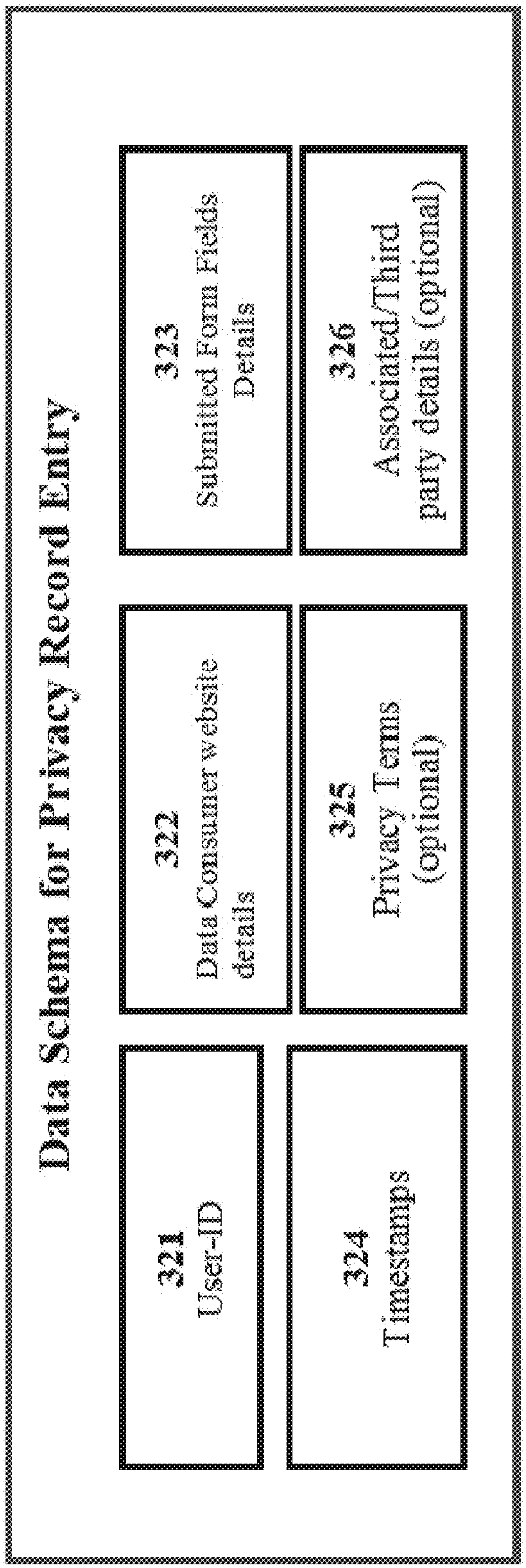
FIG. 3 illustrates an exemplary sample database filed schema for privacy record entry.

FIG. 3 shows the sample data field schema for privacy record entry. The privacy tracker database 320 stores user privacy profile and privacy data history in database. Data field schema includes User ID 321, data consumer website details 322, submitted form field 323 and timestamps 324, privacy terms which are optional 325 and associated/third party details which are also optional 326. Users have option to customize the information based on privacy requirements. Information related to privacy agreements/terms 325 can also be stored in privacy tracker database if it is made available to user during data submission. Agreements 326 may mention details of third party with whom data can be shared by data collecting web site. Database 320 will have option to record those details also.

Figure 4:
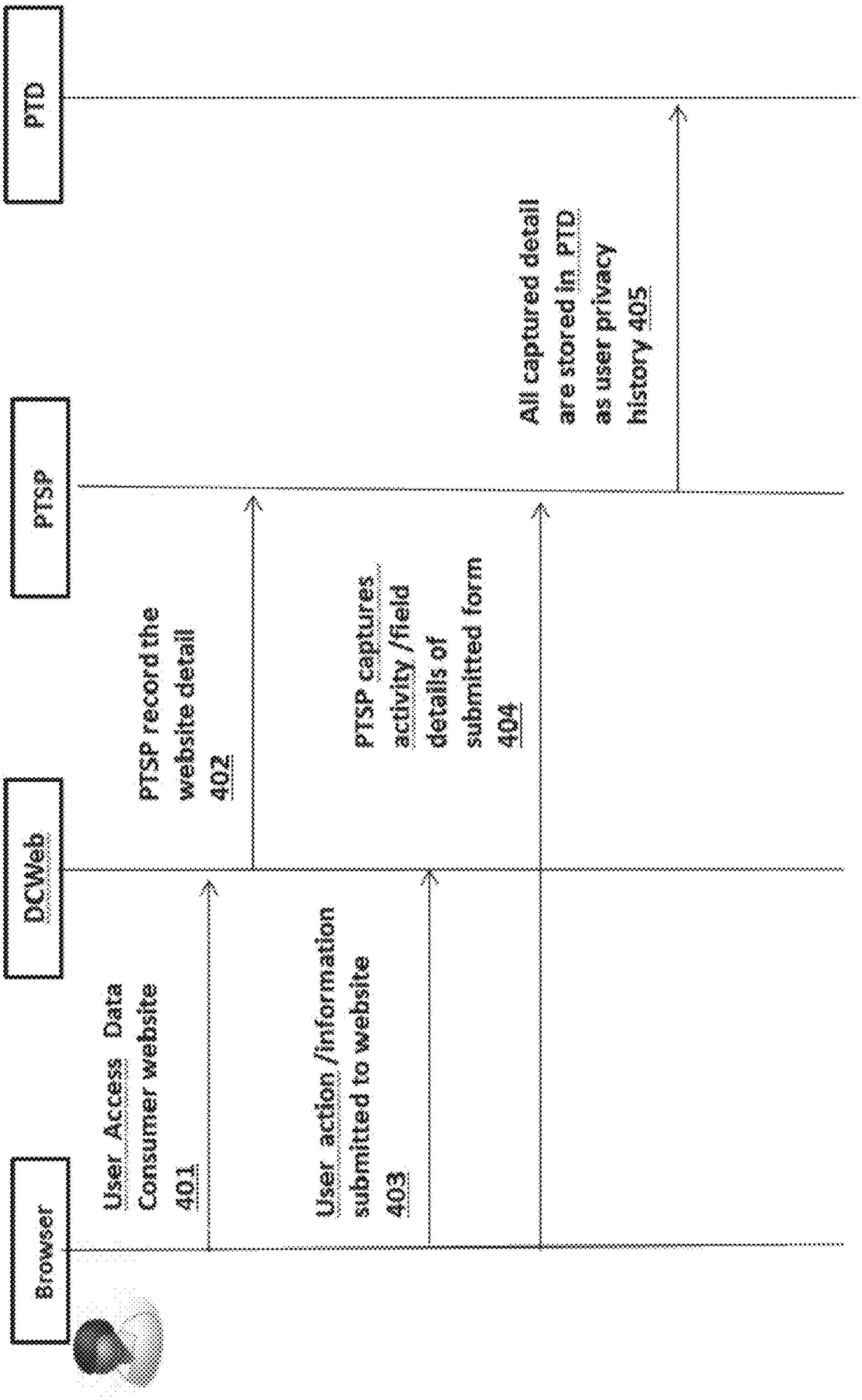
FIG. 4 illustrates the workflows of a user accesses a website and submits personal information.

FIG. 4 shows the work flow when a user accesses a website at 401 and submits personal information at 403. User installs privacy tracker service plugin which sits in the browser and routes all HTTP traffic through it. The browser can access any third party website or any data consumer website. The privacy tracker service plugin gets activated when a user opens a data consumer website or a third party website.

The privacy tracker service plugin generates profiles to assist the user to select data fields as per his preferences. The privacy tracker service plugin captures only the user selected data fields and the corresponding browsing history of the user selected data fields at 404. These user selected data fields and their corresponding browsing history is stored in privacy tracker database at 405.

Thus when a website presents a form, user fills it with his details at 403. The privacy tracker service plugin keeps track of the user selected data fields and their corresponding browsing history at 404 and saves it into privacy tracker database at 405, which is a sub-system of our cloud based privacy information system. The schema of our privacy tracker database is outlined in the table in FIG. 3. Such a schema helps in aggregating and processing information relevant to user's session.

Figure 5:
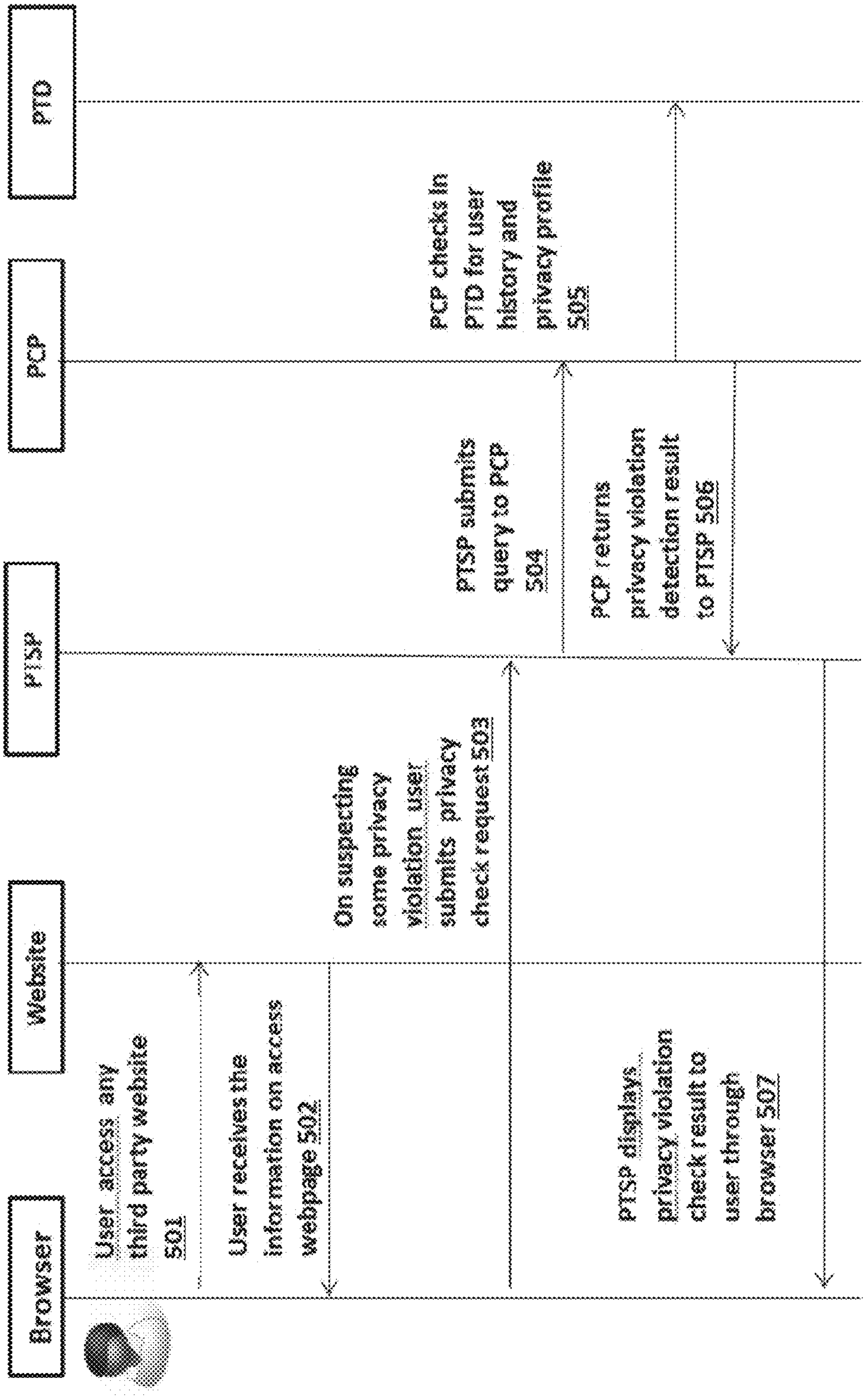
FIG. 5 illustrates the workflow of a user accesses any third party website and detects potential privacy violation.

FIG. 5 shows detection of online privacy violation in third party websites that is when a user accesses any third party website to which the user never submitted any personal information, but the site shows user's personal information.

When the user browses another site i.e. the third party site at 501 which happens to display the information entered by the user in one of his previous sessions at 502 and the user suspects for some privacy violation in the website, then the privacy tracker service plugin is triggered for the detection of online privacy violation in the third party website at 503.

This triggering of the privacy tracker service plugin allows the user to enter data field's name which the user wants to have a violation check for in the given input field at 504.

Then the privacy tracker service plugin sends the page to the privacy information processor of the privacy information system i.e. the privacy information processor is triggered by the privacy tracker service plugin to check for online privacy violation of the user entered data field in the given input field at 504.

The processor compares the submitted data field with the data field as stored in the database and then the processor matches the stored data field of the data base with its corresponding browsing history to indicate one or more websites with their related timestamps that have assisted in violating privacy of the user by leaking the submitted data field to the third party website at 505.

The PCP returns privacy violation detection result to PTSP at 506.

The privacy violation check result with one or more websites that have violated privacy of the user is displayed to the user by the browser though the PTSP . . . . The user is alerted which site in its database violated privacy of the user by leaking the information to a third party. In this way, the system assists users in tracking their information and thereby detecting privacy violation and exposure of their data on the web at 507.

Figure 6:
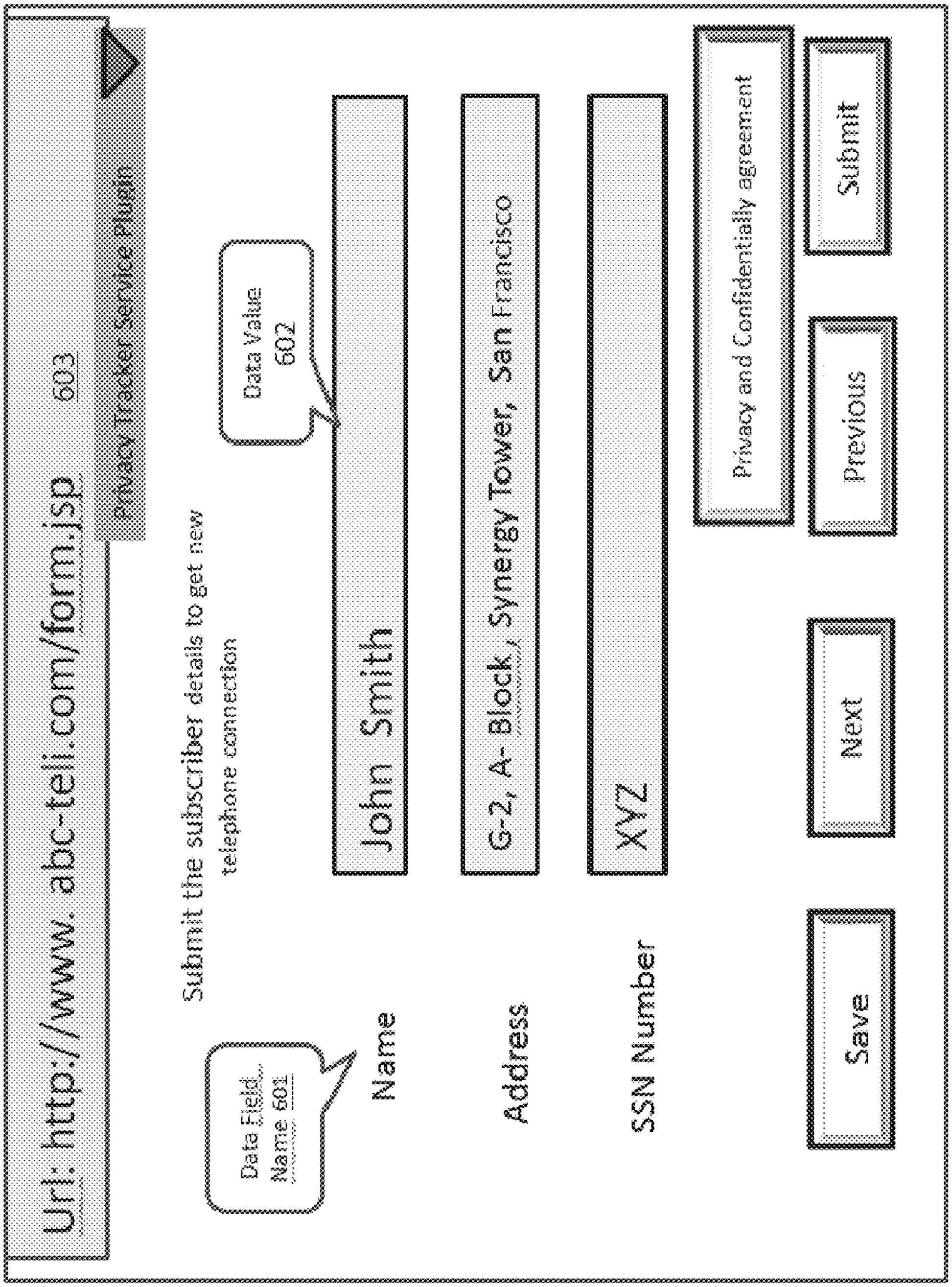
FIG. 6 illustrates an exemplary sample screen describing data field name and data value.

FIG. 6 shows the sample screen describing the data field name 601 and the data value 602. The data field name 601 is the text string which represents the name of field against which user submits the data value 602 in any web form.

FIG. 6 shows an illustrative example, which highlights the sample data field name 601 and data value 602 in one web form. In this example "Name" is a data field 601 and "John Smith" is data value 602.

In FIG. 6 the company web site 603 "abc-teli.com" is intend to collect user information for business purpose. While submitting form, user may not consider "Name" and "Address" as sensitive information from privacy perspective. However, data value 602 against "SSN number" filed could be critical and private, which user may not like to disclose to any other unintended party.

It is assumed that user has defined "SSN Number" as sensitive field in already existing privacy profile. When user submits the form data field, the privacy tracker service plugin (PTSP) intercepts the submitted web form, checks with the privacy profile and captures information about only those sensitive data fields from form, which are already defined in profile. Therefore, in this case SSN number field name is captured along with details like user id, URL where data is being submitted and time stamp of submission. This information is stored in the database by PTSP and retrieved later when privacy violation check need to be performed. Some data collecting website may provide the privacy term and agreements before data submission. PTSP captures the agreement and stores in users privacy history database.

The approach of storing data filed name and other related information at tracking service provider that is hosted in cloud ensures that user's sensitive data does not get compromised, as data field values which are sensitive are never captured and shared with hosting services.

Further concept of personalizing privacy profile ensures that only sensitive information defined by user is captured during data submission. Provision of keeping only privacy profile related information in database increase the performance of query operation during privacy violation check and reduce the storage size also.

Figure 7:
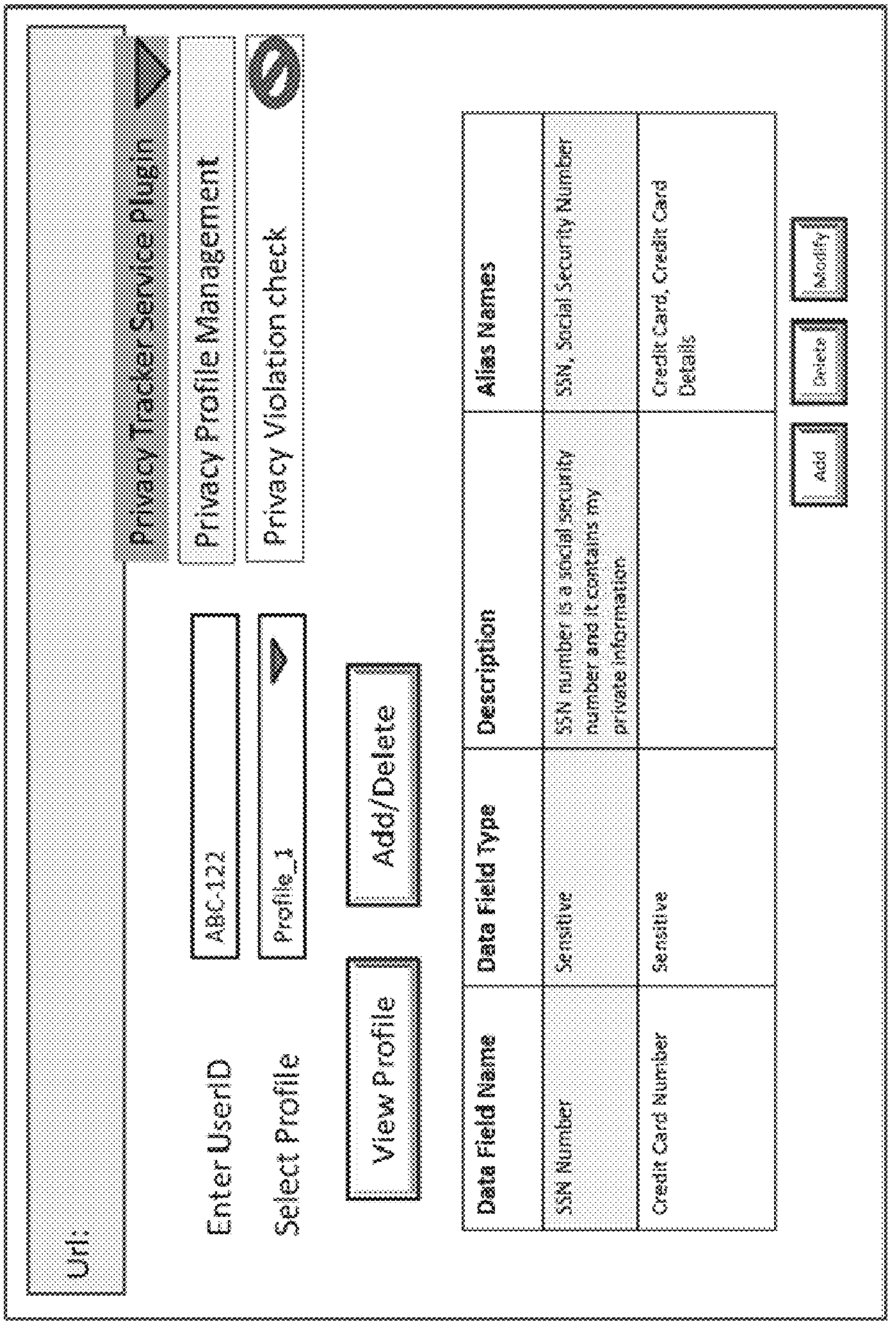
FIG. 7 illustrates an exemplary sample screen for privacy profile management.

FIG. 7 shows a sample screen is displayed to describe the interface of privacy profile management. User enters the unique user-ID code to view list of profiles. User can define more than one profile and manage them. Entries within profile can have fields like Data field Name, Data field Type, Description and Alias name. Alias name field allows entering various possible alternate data field names against one data field name. User can add or delete or modify data field entries based on his preferences and requirements.

Figure 8:
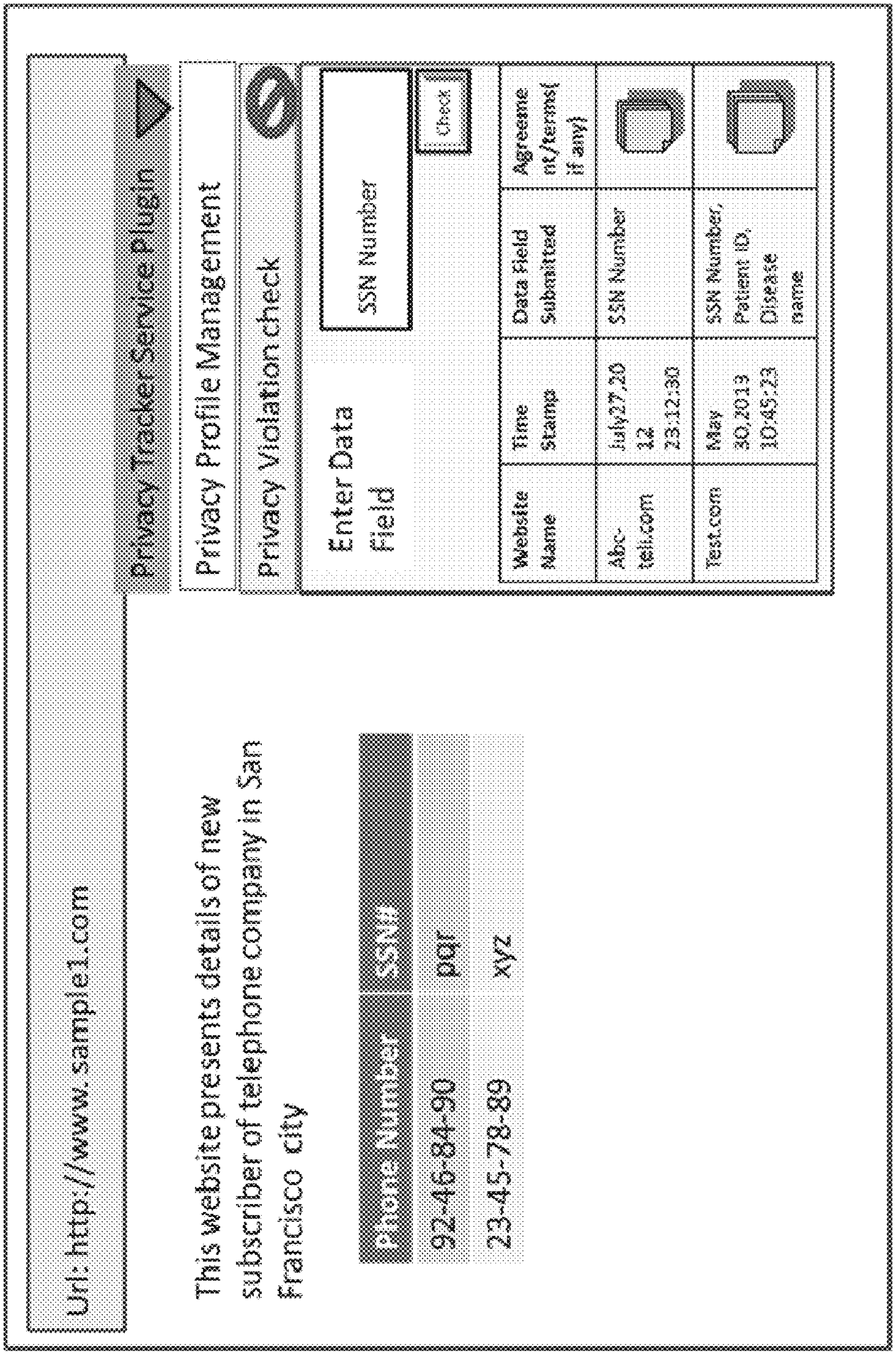
FIG. 8 illustrates an exemplary sample screen to check possible privacy violation.

FIG. 8 shows a sample screen to explain the possible interface for detecting the privacy violation check. When user visit a website (sample1.com), which display some of his details. If user suspects some policy violation, the user trigger privacy violation check option provided in PTSP. This violation check allow him to enter one or more data field name in given input field. On checking, use receives the information from privacy history database containing details of websites, where user provided value for such fields.

In this example, user when visit the sample1.com website and find his SSN number (XYZ). Suspecting possible privacy violation, he can enter "SSN Number" using privacy check feature and perform a search to find the list of various web sites, where he had provided SSN number. User may also see agreements (optional) from database if it was captured bt PTSP during the web form submission.

What is claimed is:

1. A method to detect online privacy violation, the method comprising steps of:

embedding a tracker into a web browser to open at least one data consumer website or at least one third party website, wherein a user submits at least one data value into their corresponding data field in a data consumer website;

generating one or more profile using the tracker, wherein the profile assists the user to select one or more data fields as per the user preferences;

capturing the user selected one or more data fields and their corresponding plurality of browsing history using the tracker;

storing the profile and the plurality of browsing history into at least one database through the tracker;

triggering of the tracker for detecting online privacy violation in a third party website; and submitting at least one data field by the user into at least one input field as provided through the tracker to detect online privacy violation for the submitted data field;

wherein triggering of at least one processor using the tracker to compare the submitted data field with the data field as stored in the database and matching of the stored data field with its corresponding browsing history to indicate one or more websites with their related timestamps that have assisted in violating privacy of the user by leaking the submitted data field to the third party website.

2. The method as claimed in claim 1 wherein the tracker gets activated when a user opens a data consumer website or a third party website.

3. The method as claimed in claim 1 wherein the data field comprises combination of one or more user-IDs or one or more data consumer website details or one or more submitted form field details or one or more time stamps or one or more privacy terms or one or more third party details.

4. The method as claimed in claim 1 wherein the generating one or more profiles using a profile management module of the tracker.

5. The method as claimed in claim 1 wherein the capturing the user selected one or more data field and their corresponding plurality of browsing history using a capturing module of the tracker.

6. The method as claimed in claim 4 wherein the profile management module enables user to add, modify, and delete the profile as per their requirement and preferred data fields by the user.

7. The method as claimed in claim 1 wherein the processing of privacy violation detection are on at least one cloud computing based system.

8. The method as claimed in claim 1 wherein the storing of one or more profiles and browsing history are on at least one cloud computing based system.

9. The method as claimed in claim 1 further comprises alerting the user with one or more websites that have violated privacy of the user though the tracker from the processor.

10. A system to detect online privacy violation, the system comprising:

a first processor configured to execute a browser to open at least one data consumer website or at least one third party website, wherein in the data consumer website the user submits at least one data value into a corresponding data field;

a tracker embedded into the browser, the tracker configured to assist to generate one or more profiles for the user, the profile configured to enable the user to select one or more data fields as established on user preferences; wherein the tracker captures the user selected data field and a corresponding plurality of browsing history; and a second processor configured to execute a privacy system and at least one database, the privacy system operatively connected with the tracker; wherein the database stores the profile and the plurality of browsing history;

wherein the tracker is triggered through the user for detecting an online privacy violation in a third party website, wherein the tracker enables the user to submit at least one data field into at least one input field as provided through the tracker to detect the online privacy violation for the submitted data field;

wherein the second processor is configured to be triggered by the tracker to compare the submitted data field with the stored data field in the database and matching of the stored data field with its corresponding browsing history to indicate one or more websites with their related timestamps that have assisted in violating privacy of the user by leaking the submitted data field to the third party.

11. The system as claimed in claim 10 wherein the tracker is configured to be activated when a user opens a consumer data website or a third party website.

12. The system as claimed in claim 10 wherein the tracker comprises:

a profile management module to create the profile for the user;

a capturing module to capture the user selected data field and the browsing history; and a detection module configured to trigger a request to the privacy system to detect privacy violation, while accessing one or more third party websites.

13. The system as claimed in claim 12 wherein the profile management module is configured to enable the user to add, modify, and delete profile as per their requirement and the user define his preference of data fields.

14. The system as claimed in claim 10 further comprising a connectivity module operatively connected with each of the modules of the tracker to enable connectivity to the modules.

15. The system as claimed in claim 10 wherein the privacy system is in at least one cloud based system.

16. The system as claimed in claim 10 wherein the database that has the data fields stored includes a combination of user-Ids or data consumer website details or submitted form fields details or time stamps or privacy terms or third party details.

17. The system as claimed in claim 10 wherein the second processor is configured to provide alerting the user with one or more websites that have violated privacy of the user though the privacy tracker.

* * * * *